United States Patent Office 3,487,807
Patented Jan. 6, 1970

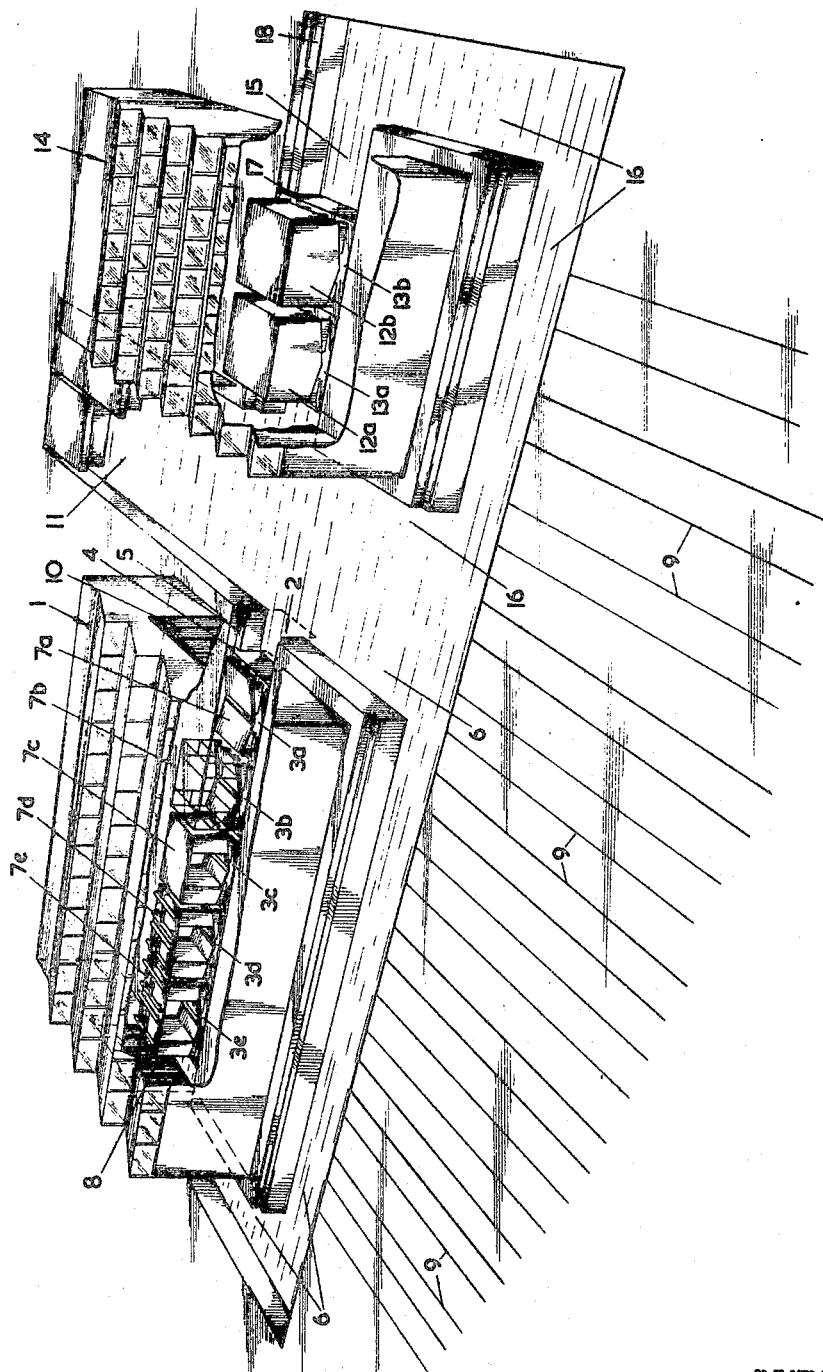

3,487,807
PROCESS FOR BUILDING A SHIP AND AN ASSEMBLING SITE FOR SHIP SECTIONS
Hendrik Adriaan Van Der Hoeven, Vlissingen, Netherlands, assignor to N.V. Koninklijke Maatschappij "De Schelde," Vlissingen, Netherlands
Filed Nov. 30, 1967, Ser. No. 686,966
Claims priority, application Netherlands, Nov. 22, 1967, 6715859
Int. Cl. B63b 3/02
U.S. Cl. 114—77                                   1 Claim

ABSTRACT OF THE DISCLOSURE

A method of mass manufacturing ship sections on movable support means wherein a series of support means are arranged alongside of each other and are displaced intermittently along a plurality of stations. Once the successive assembling operations are completed, each section is transported to a ship building area.

---

The invention relates in the first instance to a process for building a ship, according to which process in at least one assembly hall ship sections are built, which sections are successively transported to the building site of the ship, where they are secured to each other.

Such a process is known for building relatively small ships, e.g. up to 20,000 tons. The advantage of it is that a considerable part of the building operations can take place indoors, while all the requisite machining equipment and tools are ready to hand. In the known process the sections are transported from the assembly hall to the ship under construction with the aid of portal cranes and/or travelling cranes. These cranes as a rule are costly, while the maximum lifting weight is limited in practice. The largest known crane has a lifting capacity of 750 tons. Ship sections with a normal length of about 25 m., destined for ships having a tonnage of more than 25,000, will be too heavy to be lifted by the existing cranes.

Consequently the method mentioned in the preamble so far was not suitable for building very large ships. In shipbuilding there is, however, a tendency, in connection with labour cost and automation, to build ships of steadily increasing size, especially tankers. Ships with a tonnage of 1 million are already contemplated.

It is the object of the invention to obviate these disadvantages and to perfect the process mentioned in the preamble to such an extent that no cranes are required for the transport of the ship sections, at least inside the assembly hall and preferably up to the ship under construction, while at the same time the weight of the ship sections to be transported does not form any restriction for the process.

To achieve this object, according to the invention the sections are severally built on a vehicle or vessel and carried on said vehicle or vessel to a least a place where they can easily be aligned with the ship to be built or being built.

The process according to the invention can be applied in particular to the shipbuilding yard described in the applicant's copending United States patent application Ser. No. 686,954, filed Nov. 30, 1967, since in that case the floor of the building site of a ship and the floor of the assembly hall for the ship sections lie at approximately the same level, so that the vehicles and/or vessels can be carried directly to the ship under construction.

The invention further presents the possibility of rationalizing the assembling of the ship sections by carrying out—in the way of an assembly line—the successive assembling and machining stages in approximately fixed places. To this end each of the vehicles or vessels is moved intermittently and arrives successively at those stations, where the various successive assembling and machining operations for a ship section are carried out.

Thus, a vehicle or vessel may be guided successively along a station where the keel blocks are placed on said vehicle or vessel and the bottom of section is fitted, a station where the longitudinal partitions and the cross bulkheads are mounted, a station where the skin and deck plates are mounted, a station where pipes, valves, and similar accessories are fitted, and finally a station where the ship section is painted.

The width of a ship section largely depends upon the size of the ship to be built. Thus, a section for a ship of 20,000 tons may have a width of more than 20 m., while a section for a ship of 100,000 tons may have a width of about 40 m. The length of a normal ship section, however, will be chosen approximately 30 m., irrespective of the size of the ship to be built. In order to avoid the necessity of choosing the span length of and the door for the opening through which the ready ship sections leave the assembly hall very large, in a preferred embodiment of the process according to the invention it is proposed that each of the vehicles or vessels should, after completion of a section mounted thereon, leave the assembly hall in a direction perpendicular to the axis of the section.

The ship sections are preferably built on a pontoon, since pontoons consist of inexpensive steel boxes which are easily maneuverable. But rail vehicles as supports for ready ship sections and ship sections under construction are also possible. Such rail vehicles are costly, especially if they are to be maneuverable.

A very effective and inexpensive combination of pontoons and rail vehicles consists in that the ship sections are built on a rail vehicle, while each rail vehicle during the building of a section thereon is present on a pontoon provided with rails; after completion of the section the pontoon is then sailed from the assembly hall to a place where the rails are connected with rails leading to the ship under construction, after which the vehicle with the section is driven from the pontoon to the ship under construction.

The invention furnishes yet another solution for the problem of transporting ready ship sections to the ship under construction, the ship sections being built on a sledge which is mounted on a pontoon, which after completion of the section is sailed to a floor connecting up with the building floor of the ship, while a strip of the floor leading to the ship under construction is coated with a friction-reducing agent, such as grease or foam, and the sledge with the section is slid to the ship.

The invention further relates to an assembly site for ship sections, which building site is intended to be used in building a ship according to the above process.

For this, the invention aims at such a design of said assembling site that it is possible to shunt out a vehicle or vessel and park it temporarily, e.g., in case of calamities during the building of a ship section. For this purpose the assembling site is characterized by a closed path for the movement of the vehicles or vessels on which the sections can be made.

It will be obvious that once a line of vehicles or vessels with the sections present thereon, moves along the closed path, the sequence and the number of vehicles or vessels can be varied in a simple way by temporarily shunting out one or more vehicles or vessels on a siding or in a basin. Vehicles or vessels on which special ship sections, not fitting in with the normal building scheme, are made (such as engine room sections) can then be built in a separate assembling hall and later can easily be introduced into the line of ship sections to be successively transported to the building site of the ship. The planning for the building of the ship is thus very flexible.

For the closed path it is quite possible to use a rail track. In connection with the large weights of the sections to be built, however, rail vehicles are expensive, in particular if the vehicles must be capable of changing their direction. It is therefore preferable for the closed path to consist of a fairway in which pontoons for supporting the sections are adapted to float.

During the various assembling stages the pontoons should be motionless and be firmly supported. To ensure this, the sides of the fairway near their upper ends project in steps, as a result of which horizontal supporting faces for protruding parts of the pontoons are formed. It will be obvious that the protruding parts of the pontoons can be made to rest on the supporting faces by lowering the water level in the fairway or by pumping water into the pontoons.

In order that the dimensions of the pontoons may be adapted to the size of the sections to be built, the pontoons can preferably be combined to form larger floating units.

Finally the invention relates to a building floor for connecting ship sections to each other. If this building floor and the floor of the above mentioned assembling hall have the same level, the building floor comprises rails which are connected to the closed path for said vehicles or vessels.

Another possibility is that said building floor comprises fairways, which join the closed path in and adjacent the assembling hall. In that case the pontoons may sail from the assembling hall for the ship section to the ship under construction. This ship will be assembled on the pontoons. During the launching of the ship by pumping water around the ship, the pontoons will be filled with water and will not float.

The invention will now be explained with reference to the drawing. The figure shows a perspective view of an example of a building site for ship sections.

In an assembling hall 1 has been provided a fairway 2, in which pontoons 3a–e are present, which can float if the water level in the fairway is sufficiently high. On two facing sides the pontoons have protruding parts 4, each of which is adapted, when the water level in the fairway is relatively low, to rest on a horizontal supporting face of stepped projecting parts 5 of the sides of the fairway 2.

Outside the hall the fairway 2 is extended with a channel 6, fairway 2 and channel 6 together forming a closed sailing track. On the pontoons 3a to e incl., which form one continuous line, complete ship sections 7a–e are built by a method that may be compared to an assembling line system. Thus, in the figure, on pontoon 3a the keel blocks are placed and the bottom of a section 7a is fitted, on pontoon 3b longitudinal partitions and cross bulkheads for a section 7b are mounted, on pontoon 3c skin and deck plates for a section 7c are mounted, on pontoon 3d pipes, valves, and similar accessories for a section 7d are fitted, while on pontoon 3e section 7e is painted.

During the period in which operations take place on the pontoons 3a–e the water level in the fairway is so low, or the pontoons are filled with so much water, that the protruding parts 4 of the pontoons 3a–e rest on the horizontal supporting face of the projecting parts 5 of the sides of the fairway 2.

When all the above-mentioned operations have been finished, the water level is raised or water is pumped from the pontoons until the pontoons will float, after which they are simultaneously moved to a next station so that e.g., pontoon 3a comes to lie on the site of pontoon 3b, pontoon 3b on the site of pontoon 3c, etc. Pontoon 3e is sailed from the hall via an opening 8 which can be shut off by a door, and is transported in the channel 6 to a place where the completely finished ship section 7e present on said pontoon 3e can be easily transferred to the building site of the ship. In general the keel blocks to support a section will form part of a vehicle or sledge which is placed on a pontoon during the assembling of a section. Preferably each of the ship sections is built on a rail vehicle mounted on a pontoon with rails. The removal of a ship section from a pontoon in that case is simply effected by alignment of the rails on the pontoon with the rails leading to the building site, upon which the vehicle is driven off the pontoon to the ship under construction, where the ship section 7e is aligned with the part of the ship that has already been completed and is connected thereto.

A strip of the floor leading to the building site of a ship might also be coated with a friction-reducing agent, such as grease or foam, a sledge with a ship section thereon being slid on said smooth strip from a pontoon towards the ship under construction.

The process described above is particularly suitable to be used with a shipbuilding yard and process as described in applicant's copending United States patent application Ser. No. 686,954 noted hereinbefore where the building site of the ship lies at approximately the same level as the floor of the assembling hall for the ship sections, the launching of the ship being effected by building about the ship an embankment connecting up with a basin and pumping water within said embankment, so that the ship is made to float.

In consequence of the movement of the pontoons, on the site which was occupied by pontoon 3a an empty space has been formed, which is filled by the entrance—e.g. from a parking basin 11—of a new pontoon via the opening 10 which can be shut off by a door. If desired, the pontoon 3e can also be transferred to the site that has been cleared, at least if first the ship section 7e has been removed from it. On this newly arrived pontoon, keel blocks (or a vehicle having support members for a section) can be mounted and bottom plates can be fitted.

The assembling line system described above presents the advantage that particular operations can always be carried out at approximately the same station, so that transport of machines and parts may take place very efficiently. Owing to the closed form of the sailing track 2, 6 it is possible to shunt out a pontoon in a short time without the sequence of the others having to be changed. This shunting-out may be necessary in case of calamities.

In view of their more complicated construction, ship sections in which the engine room of the ship under construction is to be accommodated will generally not fit in with the assembling system for the other sections. Moreover these sections should have a greater length than the normal sections (e.g. twice their length). Accordingly these engine room sections 12a, b are built on pontoons 13a, b (having about twice the width of the others) in a second assembling hall 14, which like the first hall 1 is provided with a fairway 15 (having about twice the width of the other), which forms a closed sailing track with a channel 16.

These pontoons 13a, b also have protruding parts 17 facing each other, so that, when the water level is low, they are adapted to rest on the horizontal supporting faces of stepped projecting parts 18 of the sides of the fairway 15.

In the figure the right part of the channel 6 coincides with the left part of the channel 16, so that the tracks together have the form of a recumbent eight, while in the backward extension of these coinciding channel parts 6, 16 the abovementioned parking basin 11 is provided.

If an engine room section 12 is completed and is to be transported to the ship under construction, the water level is raised or water is pumped from the pontoons, and the pontoon is conveyed in floating condition to one of the sets of rails, where the ship section supported on a vehicle is transferred from the pontoons to the ship under construction. It will be obvious that the two assembling halls 1 and 14 and the closed sailing tracks 2,6:15,16 may also have a different position with respect to each other from that shown in the figure. Thus, instead of beside the assembling hall 1 the assembling hall 14 may also be placed behind it. It is a prerequisite that the fairways 2, 15 and channels 6, 16 are so arranged that the pontoons can be sailed from both halls 1, 14 to each of the sets of rails 9, while each of the fairways 2, 15 in the halls 1, 14 should form part of a closed sailing track.

Furthermore it is essential that the longitudinal direction of the fairways 2, 15 in the halls should coincide with the transverse direction of the ready ship sections 7 and 12 respectively, since in that case the entrances and exits of the halls (10, 8 for hall 1; not shown for hall 14) have a span length slightly exceeding the length of a section. This length of the section may be chosen independent of the weight of the ship to be built and is about 20–30 m. (Engine room section may have a length of 60 m.). If the sections were to leave the assembling hall in the longitudinal direction, the span of the entrance and exit openings would have to have a length that is greater than the width of a ship section for a ship to be built, with maximum dimensions to be expected in the future. A tanker of 500,000 tons may have a maximum width of 75 m., so that also the span of an assembling hall would have to be longer than 75 m. in that case.

It is to be noted that the process and assembling and building site described with reference to the figure only form a preferred construction.

In the first instance the only characteristic feature is that the ship sections are built on vehicles or vessels and can be conveyed on said vehicles or vessels to a place from which they can easily be transported to the ship under construction. Inside the assembling hall and directly outside no cranes are required for moving the sections.

The process and the building site according to the invention can be used in building smaller ships on a slipway. This slipway is then, for instance, fitted on the front of and parallel to the parts of the shown channels in line with each other (i.e. in the figure from the left to the right in the foreground). The sections are then placed on the slipway with a crane from the vehicles or vessels.

The use of cranes for the transport of the sections however, can be abandoned altogether if the process and the building site according to the invention are combined with the method and the shipbuilding yard according to the said aforementioned U.S. patent application, according to which, after the completion of a ship, about this ship is built an embankment connecting up with a basin and within said embankment water is pumped, so as to cause the ship to float. In this connection it would be possible to join the above-mentioned channels (6, 16) with fairways extending to the space within the embankment; a pontoon with the ship section present thereon can then be sailed to that space.

With a view to the very great weights of the ship sections to be supported, pontoons are considerably less expensive than vehicles. The latter are costly in particular if they must be capable of changing their direction.

The pontoons consisting of a simple steel box preferably admit of being combined to larger floating units, so that the dimensions of the pontoons can be adapted to the dimensions of the ship sections to be built thereon.

If a pontoon is too small with respect to a fairway to be supported in the protruding parts of the walls of the fairway, a separate support construction may be employed for supporting the protruding ears of that pontoon in the fairway.

Recapitulating, it may be stated that when the process and the assembling site according to the invention are used, by far the greatest part of the operations for the building of a ship can be carried out indoors and according to an efficient assembling line system. Moreover, cranes for the transport of the ship sections can be omitted at least inside and near the assembly halls, and preferably altogether, while the process in combination with the process according to the invention suitable for constructing very large ships from prefabricated sections without the use of a building dock, a slipway, and cranes, which was hitherto impossible.

What I claim is:

1. In an assembly line method of mass manufacturing very large objects such as ship sections, the improvement which comprises fabricating and erecting ship sections on support means in assembling halls, displacing sequentially said support means along a plurality of stations so as to permit successive assembling operations of the ship sections at each station, said support means being guided along a waterway in each of said assembling halls and supported by track means along opposite parallel sides of said waterways, said track means and said support means forming tongue and groove like mating parts, said waterway forming part of a closed waterway having a side edge in juxtaposition to a building site, and floating said support means containing each finished ship section to said site whereby said section are joined together to form a ship.

References Cited

UNITED STATES PATENTS

| 2,757,447 | 8/1956 | Barenyi. | |
| 2,369,615 | 2/1945 | Smith | 114—77 |
| 2,728,319 | 12/1955 | Engstrand | 114—77 X |

FOREIGN PATENTS

| 97,144 | 11/1960 | Norway. |

TRYGVE M. BLIX, Primary Examiner

U.S. Cl. X.R.

114—65